(12) United States Patent
Jiang et al.

(10) Patent No.: US 12,672,199 B2
(45) Date of Patent: Jun. 30, 2026

(54) POINT-TO-MULTIPOINT (PTM) TRANSMISSIONS IN WIRELESS COMMUNICATION

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 271 days.

(21) Appl. No.: 18/236,956

(22) Filed: Aug. 23, 2023

(65) Prior Publication Data

US 2023/0397289 A1 Dec. 7, 2023

Related U.S. Application Data

(63) Continuation of application No. PCT/CN2022/078733, filed on Mar. 2, 2022.

(30) Foreign Application Priority Data

Mar. 3, 2021 (CN) .......................... 202110233997.5

(51) Int. Cl.
*H04W 76/27* (2018.01)
(52) U.S. Cl.
CPC .................................. *H04W 76/27* (2018.02)
(58) Field of Classification Search
CPC ......... H04W 76/27; H04W 4/06; H04W 4/10; H04L 5/00; H04L 5/0053; H04L 5/0055; H04L 5/0057
See application file for complete search history.

(56) References Cited

U.S. PATENT DOCUMENTS 11,064,434 B2 * 7/2021 Lin ................... H04W 52/0225
11,147,028 B2 10/2021 Jiang et al.
(Continued)

FOREIGN PATENT DOCUMENTS

| CN | 1735260 A | 2/2006 |
| CN | 111587600 A | 8/2020 |

(Continued)

OTHER PUBLICATIONS

Third Generation Partnership Project, "Technical Specification Group Radio Access Network; NR; Multiplexing and channel coding (Release 16)," 3GPP TS 38.212 V16.4.0 (Dec. 2020).
Third Generation Partnership Project, "Technical Specification Group Radio Access Network; NR; Physical layer procedures for control (Release 16)," 3GPP TS 38.213 V16.4.0 (Dec. 2020).
(Continued)

*Primary Examiner* — Will W Lin
(74) *Attorney, Agent, or Firm* — Volpe Koenig

(57) ABSTRACT

Discloses present a method and a device in a node for wireless communications. A node maintains a first timer; and as a response to any condition in a first condition set being satisfied, transmits a first message; a condition in the first condition set is that the first timer is expired; the first message is used for indicating at least one non-unicast identifier; the node is in a first RRC state when transmitting the first message. The present application proposes the conditions of triggering a first message in multicast group-cast cases as well as corresponding transmission method and device, making it possible to transmit the current state of the node to the network side to ensure that when using a HARQ for multicast groupcast services, the terminal is able to enter into or stay in the RRC connected state, thus enhancing the transmission reliability and optimizing the system performance.

16 Claims, 5 Drawing Sheets

(56) References Cited

U.S. PATENT DOCUMENTS

| | | | |
|---|---|---|---|
| 2012/0082105 A1 | 4/2012 | Hwang et al. | |
| 2015/0201454 A1 | 7/2015 | Shukair et al. | |
| 2016/0212595 A1 | 7/2016 | Fukuta et al. | |
| 2019/0132793 A1* | 5/2019 | Lin | H04W 52/0206 |
| 2019/0149421 A1* | 5/2019 | Jin | H04W 36/0064 |
| | | | 370/331 |
| 2020/0214070 A1* | 7/2020 | Ingale | H04W 12/106 |
| 2021/0014926 A1* | 1/2021 | Xu | H04W 76/27 |
| 2022/0124866 A1* | 4/2022 | Xu | H04W 76/10 |
| 2023/0254933 A1* | 8/2023 | Han | H04L 1/1812 |
| | | | 370/312 |
| 2024/0040626 A1* | 2/2024 | Tseng | H04W 72/542 |

FOREIGN PATENT DOCUMENTS

| | | | |
|---|---|---|---|
| CN | 111886813 A | 11/2020 |
| WO | 2004102837 A1 | 11/2004 |
| WO | 2019113766 A1 | 6/2019 |

OTHER PUBLICATIONS

Third Generation Partnership Project, "Technical Specification Group Radio Access Network; NR; Radio Resource Control (RRC) protocol specification (Release 16)," 3GPP TS 38.331 V16.3.1 (Jan. 2021).

ISR received in application No. PCT/CN2022/078733 dated May 7, 2022.

* cited by examiner

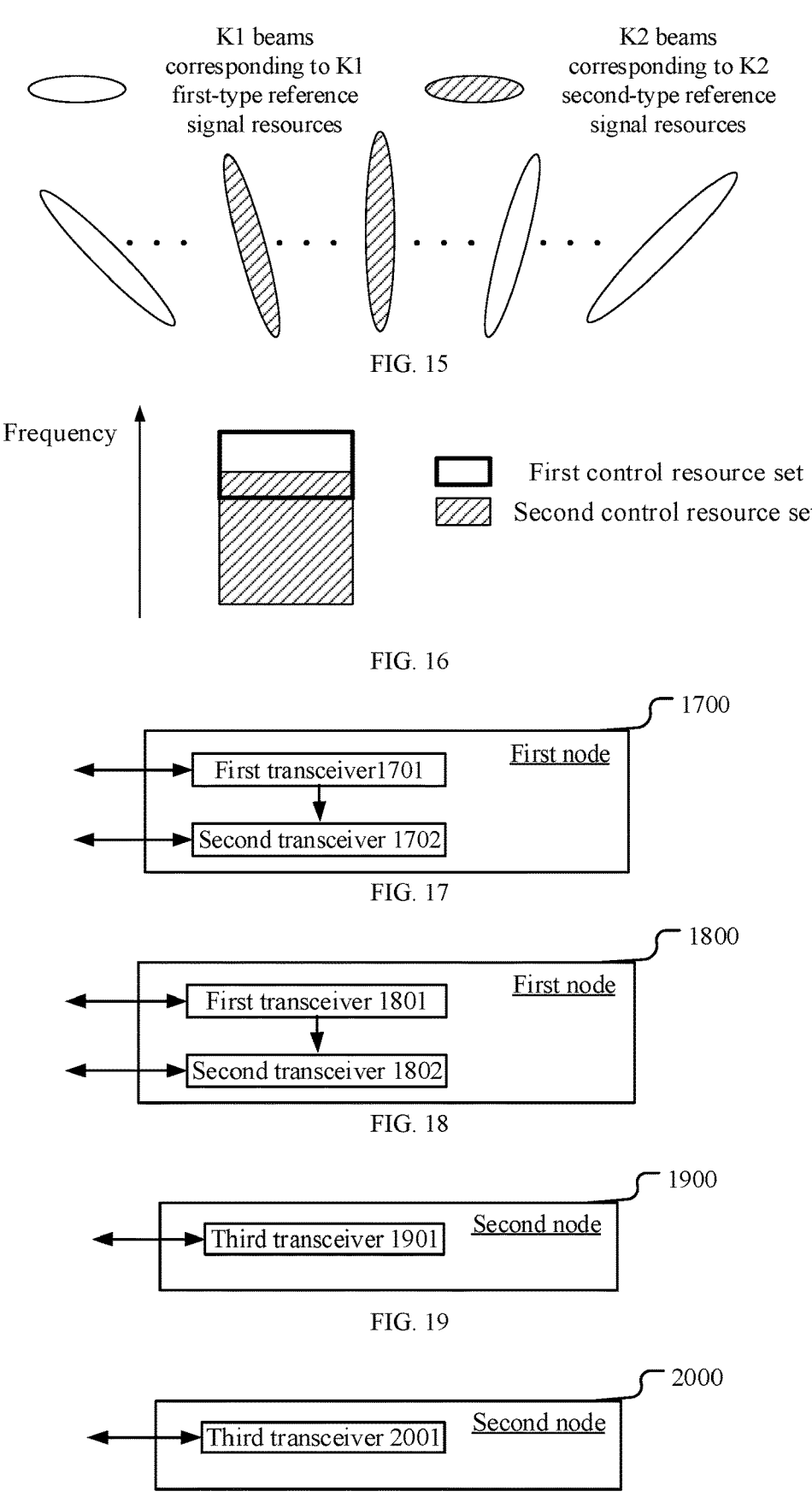

K1 beams corresponding to K1 first-type reference signal resources

K2 beams corresponding to K2 second-type reference signal resources

FIG. 15

Frequency

First control resource set

Second control resource set

First node

First transceiver1701

Second transceiver 1702

First node

First transceiver 1801

Second transceiver 1802

Second node

Third transceiver 1901

Second node

Third transceiver 2001

FIG. 20

POINT-TO-MULTIPOINT (PTM) TRANSMISSIONS IN WIRELESS COMMUNICATION

CROSS REFERENCE TO RELATED APPLICATIONS

This application is the continuation of the international patent application No. PCT/CN2022/078733, filed on Mar. 2, 2022, and claim the priority benefit of Chinese Patent Application No. 202110233997.5 filed on Mar. 3, 2021, the full disclosure of which is incorporated herein by reference.

BACKGROUND

Technical Field

The present application relates to transmission methods and devices in wireless communication systems, and in particular to a design scheme and device for uplink transmission in wireless communications.

Related Art

Discussions on how to support transmissions of Multicast and Broadcast traffics under the 5G architecture have already been started in NR Rel-17. In traditional Long-Term Evolution (LTE) and Long-Term Evolution Advanced (LTE-A) systems, a base station can support terminals in receiving multicast and groupcast traffics through the Multicast Broadcast Single Frequency Network (MBSFN) and by means of Single-Cell Point-To-Multipoint (SC-PTM). Multicast broadcast traffics based on the NR system will be designed with higher flexibility, so uplink transmissions of a User Equipment (UE) shall be redesigned.

SUMMARY

Currently, a retransmission for Point-To-Multipoint (PTM) transmission can be done not only by means of a unicast method but also a multicast method. However, when a terminal needs to transmit an uplink Hybrid Automatic Repeat reQuest (HARQ) feedback, and then a base station will retransmit multicast groupcast data to the terminal by means of unicast, the terminal shall firstly receive relevant configuration information, which requires it to be in an RRC connected state. The PTM transmission in Rel-17 is apparently supportive to the terminal when it receives PTM data in a Radio Resource Control (RRC) Connected state and RRC Inactive state, hence how to keep the terminal for performing PTM transmission in the RRC Connected state so as to better support the performance of PTM is an issue to be solved. In the meantime, the PTM in Rel-17 currently has been supporting the terminal in simultaneous receptions of unicast data and multicast groupcast data in a band, so that when some conflict occurs between configuration parameters of unicast data and configuration parameters of multicast groupcast data, how to make a choice is also seen as an issue in need of solving.

To address the above problem, the present application provides a solution. It should be noted that though the present application only took the PTM communications as a typical or exemplary scenario in the statement above, it is also applicable to other scenarios such as unicast system, where similar technical effects can be achieved. Additionally, the adoption of a unified solution for various scenarios, including but not limited to PTM, contributes to the reduction of hardcore complexity and costs. In the case of no conflict, the embodiments of any node and the characteristics in the embodiments may be applied to any other node, and vice versa. What's more, the embodiments in the present application and the characteristics in the embodiments can be arbitrarily combined if there is no conflict.

In view of the above issue, the present application discloses a method and device for uplink transmissions. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict. Further, though originally targeted at cellular networks, the present application also applies to the Internet of Things (IoT) and Vehicle-to-Everything (V2X). Further, though originally targeted at multicarrier communications, the present application also applies to single-carrier communications. Further, though originally targeted at multicast and groupcast, the present application also applies to unicast communications. Further, the present application is designed targeting terminal-base station scenario, but can be extended to inter-terminal communications, terminal-relay communications, Non-Terrestrial Networks (NTN) as well as relay base station communications, where similar technical effects can be achieved. Additionally, the adoption of a unified solution for various scenarios, including but not limited to terminal-base station communications, contributes to the reduction of hardcore complexity and costs.

Furthermore, if no conflict is incurred, embodiments in the first node in the present application and the characteristics of the embodiments are also applicable to a second node, and vice versa. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

maintaining a first timer; and transmitting a first message, as a response to any condition in a first condition set being satisfied;

herein, a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, a technical feature of the above method lies in that: With the first timer being configured, when the first timer is expired, the first node transmits the first message to a base station, for notifying the base station that the first node does not desire a switch of state, namely, it still remains in the first RRC state.

In one embodiment, another technical feature of the above method lies in that: Generally, when the first node has no unicast data to be transmitted, and it has lasted for a certain period, the base station will switch the first node from an RRC idle state to an RRC inactive state; but the base station is notified via the first message that even if the first node has no unicast data to be transmitted, there still exists multicast groupcast data transmission for the first node, so that the first node expects to be kept in the RRC connected state to avoid the switch of its RRC state, thus it can acquire the performance gains brought about by retransmitting the multicast groupcast by unicast and the introduction of HARQ-ACK in the multicast groupcast.

The present application provides a method in a first node for wireless communications, comprising:

receiving a first signaling and a second signaling; and receiving a first signal and a second signal;

herein, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, a Radio Network Temporary Identifier (RNTI) for scrambling a Cyclic Redundancy Check (CRC) carried by the first signaling and an RNTI for scrambling a CRC carried by the second signaling are used to determine the target reference signal resource from the first reference signal resource and the second reference signal resource.

In one embodiment, a technical feature of the above method lies in that: when the first signal and the second signal respectively correspond to multicast/groupcast data and unicast data, and a receiving beam used by the first signal indicated by the first signaling is different from a receiving beam used by the second signal indicated by the second signaling, the first node determines which one of the receiving beams is to be used for receiving according to the priorities of the first signal and the second signal or transmission types of the first signal and the second signal.

According to one aspect of the present application, comprising:

receiving target data;

herein, the action of maintaining a first timer comprises: as a response to receiving the target data, starting or restarting the first timer; the target data comprises a Medium Access Control (MAC) Service Data Unit (SDU) from a Dedicated Traffic Channel (DTCH), or a Dedicated Control Channel (DCCH) or a Common Control Channel (CCCH).

In one embodiment, a technical feature of the above method lies in that: the first timer is used for counting a time length in which the first node does not receive unicast data, each time when the first node receives a piece of unicast data, i.e., the target data, the first timer is recounted.

According to one aspect of the present application, comprising:

transmitting uplink data;

herein, the action of maintaining a first timer comprises: as a response to transmitting the uplink data, starting or restarting the first timer; the uplink data comprises a MAC SDU from a DTCH or a DCCH.

In one embodiment, a technical feature of the above method lies in that: the first timer is used for counting a time length in which the first node does not transmit unicast data, each time when the first node transmits a piece of unicast data, i.e., the uplink data, the first timer is recounted.

According to one aspect of the present application, comprising:

monitoring a second message in a first time window; and determining whether to enter into an RRC idle state according to whether the second message is detected;

herein, an expiration of the first timer is used to trigger a transmission of the first message; a time of transmitting the first message is used to determine the first time window; the action of determining whether to enter into an RRC idle state according to whether the second message is detected comprises: not entering the RRC idle state when the second message is detected, or entering the RRC idle state when the second message is not detected.

In one embodiment, a technical feature of the above method lies in that: as a response to the first message, the base station explicitly asks the first node not to enter into an RRC idle state via the second message.

According to one aspect of the present application, comprising:

switching from a first Bandwidth Part (BWP) to a second BWP;

herein, the action of maintaining a first timer comprises: as a response to the action of switching from the first BWP to the second BWP, starting or maintaining the first timer.

In one embodiment, a technical feature of the above method lies in that: when the first BWP is configured to be used for multicast groupcast traffic transmission, while the second BWP is configured to be used for unicast traffic transmission, and there occurs an action of switching from the first BWP to the second BWP, the first node starts the first timer; namely, when the first node has left a multicast groupcast BWP for over a certain period, the first node is required to transmit the first message to notify the base station.

According to one aspect of the present application, comprising:

monitoring a third message in a first time window; and determining whether to be camped on the second BWP according to whether the third message is detected;

herein, an expiration of the first timer is used to trigger a transmission of the first message; a time of transmitting the first message is used to determine the first time window; the action of determining whether to be camped on the second BWP according to whether the third message is detected comprises: not being camped on the second BWP when the third message is detected, or being camped on the second BWP when the third message is detected.

In one embodiment, a technical feature of the above method lies in that: when having left the first BWP, i.e., the BWP configured with multicast groupcast transmission for too long, the first node transmits the first message, and starts to detect the third message; the third message as feedback of the base station for the first message indicates that the first node is not camped on the second BWP, and that it will be switched to a BWP supporting multicast groupcast traffics.

According to one aspect of the present application, frequency-domain resources occupied by the first signal is a first subcarrier set, while frequency-domain resources occupied by the second signal is a second subcarrier set, the first subcarrier set and the second subcarrier set belonging to a target BWP, and the first subcarrier set being orthogonal with the second subcarrier set in frequency domain.

In one embodiment, a technical feature of the above method lies in that: the first signal and the second signal are Frequency Division Multiplexing (FDM).

According to one aspect of the present application, both frequency-domain resources occupied by the first signaling and frequency-domain resources occupied by the second signaling belong to a target control resource set, the target control resource set being associated with a first-type reference signal resource set and a second-type reference signal resource set; the first field comprised by the first signaling is used to indicate the first reference signal resource in the first-type reference signal resource set; the second field comprised by the second signaling is used to indicate the second reference signal resource in the second-type reference signal resource set.

In one embodiment, a technical feature of the above method lies in that: when the first signaling and the second signaling respectively belong to two different Control Resource Sets (CORESETs), the above two different CORESETs are respectively associated with two different Transmission Configuration Indication (TCI) tables for respectively corresponding to an indication of a receiving beam of a multicast groupcast Physical Downlink Shared Channel (PDSCH) and an indication of a receiving beam of a unicast PDSCH.

According to one aspect of the present application, frequency-domain resources occupied by the first signaling and frequency-domain resources occupied by the second signaling respectively belong to a first control resource set and a second control resource set, where there exists overlapping frequency-domain resources between frequency-domain resources occupied by the first control resource set and frequency-domain resources occupied by the second control resource set; a search space set associated with the first control resource set is associated with the first identifier, while a search space set associated with the second control resource set is not associated with the first identifier; a demodulation reference signal of a control signaling in the second control resource set and a demodulation reference signal of a control signaling in the first control resource set are Quasi Co-located (QCL).

In one embodiment, a technical feature of the above method lies in that: when there is an overlap between a search space set used for multicast groupcast scheduling signaling transmission and a search space set used for unicast scheduling signaling transmission, a receiving beam used by the search space set for unicast scheduling signaling transmission follows a receiving beam used by the search space set for multicast groupcast scheduling signaling transmission.

The present application provides a method in a second node for wireless communications, comprising:
    receiving a first message;
    herein, a transmitter of the first message includes a first node, the first node maintaining a first timer, and as a response to any condition in a first condition set being satisfied, the first node transmits a first message; a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

The present application provides a method in a second node for wireless communications, comprising:
    transmitting a first signaling and a second signaling; and
    transmitting a first signal and a second signal;
    herein, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

According to one aspect of the present application, comprising:
    transmitting target data;
    herein, the first node receives the target data; the action of maintaining a first timer comprises: as a response to receiving the target data, the first node starts or restarts the first timer; the target data comprises a MAC SDU from a DTCH, or a DCCH, or a CCCH.

According to one aspect of the present application, comprising:
    receiving uplink data;
    herein, the first node transmits the uplink data; the action of maintaining a first timer comprises: as a response to transmitting the uplink data, the first node starts or restarts the first timer; the uplink data comprises a MAC SDU from a DTCH or a DCCH.

According to one aspect of the present application, comprising:
    transmitting a second message in a first time window;
    herein, the first node determines whether to enter into an RRC idle state according to whether the second message is detected; an expiration of the first timer is used to trigger that the first node transmits the first message; a time of transmitting the first message is used to determine the first time window; the action of determining whether to enter into an RRC idle state according to whether the second message is detected comprises: the first node not entering the RRC idle state when detecting the second message, or the first node entering the RRC idle state when not detecting the second message.

According to one aspect of the present application, comprising:

determining that the first node switches from a first BWP to a second BWP;

herein, the action of maintaining a first timer comprises: as a response to the action of switching from the first BWP to the second BWP, the first node starting or maintaining the first timer.

According to one aspect of the present application, comprising:

transmitting a third message in a first time window;

herein, the first node determines whether to be camped on the second BWP according to whether the third message is detected; an expiration of the first timer is used to trigger that the first node transmits the first message; a time of transmitting the first message is used to determine the first time window; the action of determining whether to be camped on the second BWP according to whether the third message is detected comprises: the first node not being camped on the second BWP when the third message is detected, or the first node being camped on the second BWP when the third message is detected.

According to one aspect of the present application, frequency-domain resources occupied by the first signal is a first subcarrier set, while frequency-domain resources occupied by the second signal is a second subcarrier set, the first subcarrier set and the second subcarrier set belonging to a target BWP, and the first subcarrier set being orthogonal with the second subcarrier set in frequency domain.

According to one aspect of the present application, both frequency-domain resources occupied by the first signaling and frequency-domain resources occupied by the second signaling belong to a target control resource set, the target control resource set being associated with a first-type reference signal resource set and a second-type reference signal resource set; the first field comprised by the first signaling is used to indicate the first reference signal resource in the first-type reference signal resource set; the second field comprised by the second signaling is used to indicate the second reference signal resource in the second-type reference signal resource set.

According to one aspect of the present application, frequency-domain resources occupied by the first signaling and frequency-domain resources occupied by the second signaling respectively belong to a first control resource set and a second control resource set, where there exists overlapping frequency-domain resources between frequency-domain resources occupied by the first control resource set and frequency-domain resources occupied by the second control resource set; a search space set associated with the first control resource set is associated with the first identifier, while a search space set associated with the second control resource set is not associated with the first identifier; a demodulation reference signal of a control signaling in the second control resource set and a demodulation reference signal of a control signaling in the first control resource set are Quasi Co-located (QCL).

The present application provides a first node for wireless communications, comprising:

a first transceiver, maintaining a first timer; and a second transceiver, transmitting a first message, as a response to any condition in a first condition set being satisfied;

herein, a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

The present application provides a first node for wireless communications, comprising:

a first transceiver, receiving a first signaling and a second signaling; and a second transceiver, receiving a first signal and a second signal;

herein, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

The present application provides a second node for wireless communications, comprising:

a third transceiver, receiving a first message;

herein, a transmitter of the first message includes a first node, the first node maintaining a first timer, and as a response to any condition in a first condition set being satisfied, the first node transmits a first message; a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

The present application provides a second node for wireless communications, comprising:

a third transceiver, transmitting a first signaling and a second signaling; and transmitting a first signal and a second signal;

herein, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, compared with the prior art, the present application is advantageous in the following aspects:

with the first timer being configured, when the first timer is expired, the first node transmits the first message to a base station, for notifying the base station that the first node does not desire a switch of state, namely, it still remains in the first RRC state.

generally, when the first node has no unicast data to be transmitted, and it has lasted for a certain period, the base station will switch the first node from an RRC idle state to an RRC inactive state; in this case the base station is notified via the first message that even if the first node has no unicast data to be transmitted, there still exists multicast groupcast data transmission for the first node, so that the first node expects to be kept in the RRC connected state to avoid the switch of its RRC state, thus it can acquire the performance gains brought about by retransmitting the multicast groupcast by unicast and the introduction of HARQ-ACK in the multicast groupcast;

when the first signal and the second signal respectively correspond to multicast/groupcast data and unicast data, and a receiving beam used by the first signal indicated by the first signaling is different from a receiving beam used by the second signal indicated by the second signaling, the first node determines which one of the receiving beams is to be used for receiving according to the priorities of the first signal and the second signal or transmission types of the first signal and the second signal;

the first timer is used for counting a time length in which the first node does not transmit unicast data, each time when the first node transmits a piece of unicast data, i.e., the uplink data, the first timer is recounted;

when the first BWP is configured to be used for multicast groupcast traffic transmission, while the second BWP is configured to be used for unicast traffic transmission, and there occurs an action of switching from the first BWP to the second BWP, the first node starts the first timer; namely, when the first node has left a multicast groupcast BWP for over a certain period, the first node is required to transmit the first message to notify the base station.

BRIEF DESCRIPTION OF THE DRAWINGS

Other features, objects and advantages of the present application will become more apparent from the detailed description of non-restrictive embodiments taken in conjunction with the following drawings:

FIG. 15 illustrates a schematic diagram of a first-type reference signal resource set and a second-type reference signal resource set according to one embodiment of the present application.

FIG. 16 illustrates a schematic diagram of a first control resource set and a second control resource set according to one embodiment of the present application.

FIG. 17 illustrates a structure block diagram of a processing device in a first node according to one embodiment of the present application.

FIG. 18 illustrates a structure block diagram of a processing device in a first node according to another embodiment of the present application.

FIG. 19 illustrates a structure block diagram a processing device in a second node according to one embodiment of the present application.

FIG. 20 illustrates a structure block diagram a processing device in a second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
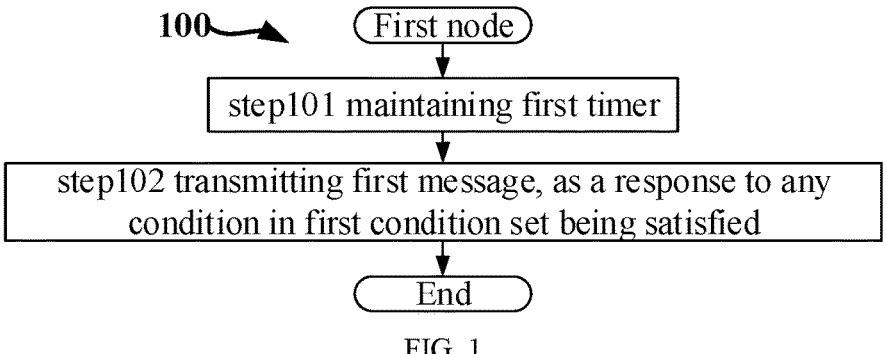
FIG. 1 illustrates a flowchart of processing of a first node according to one embodiment of the present application.

Embodiment 1 illustrates a flowchart of processing of a first node, as shown in FIG. 1. In 100 illustrated by FIG. 1, each box represents a step. In Embodiment 1, the first node in the present application maintains a first timer in step 101; and transmits a first message in step 102, as a response to any condition in a first condition set being satisfied.

In Embodiment 1, a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the first timer is a dataInactivity-Timer.

In one embodiment, the first timer is a t-PollRetransmit.

In one embodiment, the first timer is measured in milli-seconds (ms).

In one embodiment, the above phrase of an operation "maintaining a first timer" includes: incrementing a value of the timer by 1 per time unit before an expiration of the timer.

In one embodiment, a duration of the time unit in the present application is 1 ms.

In one embodiment, a duration of the time unit in the present application does not exceed 1 ms.

In one embodiment, a duration of the time unit in the present application is 1 slot.

In one embodiment, a condition in the first condition set is that a buffer for a MAC SDU is empty.

In one embodiment, a condition in the first condition set is that a buffer for target data is empty.

In one subembodiment, the target data comprises MAC SDUs from a DTCH, a DCCH and a CCCH.

In one subembodiment, the target data does not comprise a MAC SDU from a MTCH.

In one subembodiment, the target data does not comprise a MAC SDU from a Multicast Control Channel (MCCH).

In one subembodiment, the target data does not comprise a MAC SDU from a Single Carrier-Multicast Traffic Channel (SC-MTCH).

In one subembodiment, the target data does not comprise a MAC SDU from a Single Carrier-Multicast Control Channel (SC-MCCH).

In one embodiment, the first message comprises an RRC signaling.

In one embodiment, the first message comprises a MAC CE.

In one embodiment, a physical layer channel bearing the first message includes a Physical Uplink Control Channel (PUCCH).

In one embodiment, a physical layer channel bearing the first message includes a Physical Uplink Shared Channel (PUSCH).

In one embodiment, the first message is transmitted on a unicast channel.

In one embodiment, the unicast channel in the present application includes a transport channel.

In one embodiment, the transport channel in the present application is an Uplink Shared Channel (UL-SCH).

In one embodiment, the unicast channel in the present application includes a logical channel.

In one embodiment, the logical channel in the present application is a DTCH.

In one embodiment, the non-unicast in the present application includes multicast.

In one embodiment, the non-unicast in the present application includes groupcast.

In one embodiment, the non-unicast in the present application includes multicast groupcast.

In one embodiment, the non-unicast in the present application includes broadcast.

In one embodiment, the non-unicast identifier is a ses-sionID.

In one embodiment, the non-unicast identifier is a Logical Channel Identifier (LCID) of a non-unicast channel.

In one embodiment, the non-unicast identifier is a Tem-porary Mobile Group Identity (TMGI).

In one embodiment, the non-unicast identifier is an RNTI.

In one embodiment, the non-unicast identifier is an RNTI other than a Cell Radio Network Temporary Identifier (C-RNTI).

In one embodiment, the non-unicast identifier is a Group Radio Network Temporary Identifier (G-RNTI).

In one embodiment, the non-unicast identifier is a Mul-timedia Broadcast/Multicast Service (MBMS) MbmsInter-estIndication.

In one embodiment, the non-unicast identifier is a Group Common Radio Network Temporary Identifier (GC-RNTI).

In one embodiment, the non-unicast identifier is a Single Carrier Radio Network Temporary Identifier (SC-RNTI).

In one embodiment, the non-unicast identifier is a Single Carrier Point to Multipoint Radio Network Temporary Iden-tifier (SC-PTM-RNTI).

In one embodiment, the non-unicast identifier is a Single Carrier Single Frequency Network Radio Network Tempo-rary Identifier (SC-SFN-RNTI).

In one embodiment, the first RRC state is an RRC Connected state.

In one embodiment, the first RRC state is an RRC Inactive state.

In one embodiment, the above phrase that "the first RRC state is an RRC Inactive state" comprises that: the first node can transmit or receive unicast data.

In one embodiment, transmitting the first message enables a receiver of the first message to acquire the communication requests of the first node at present, so that it can make a more accurate scheduling decision that meets the first node's needs, hence the solution to technical issue confronting the present application.

In one embodiment, how the first message is utilized by a receiver of the first message is related to implementation of the receiver of the first message.

In one embodiment, the first message is used by a receiver of the first message to determine whether the first node is to be switched from the first RRC state to a second RRC state, where the second RRC state is a candidate state in a candidate state set, the candidate state set comprising at least an RRC idle state.

In one subembodiment, the first RRC state is an RRC connected state, where the candidate state set comprises an RRC inactive state.

In one subembodiment, the first RRC state is an RRC inactive state, where the candidate state set comprises an RRC connected state.

In one subembodiment, a receiver of the first message detects the first message, and the receiver of the first message maintains the first node in the first RRC state.

In one subembodiment, a receiver of the first message does not detect the first message, and the receiver of the first message switches the first node to the second RRC state.

In one embodiment, the first information is used to indicate that the first node is receiving non-unicast traffics.

In one embodiment, the first information is used to indicate that the first node is interested in non-unicast traffics.

In one embodiment, the first information is used to indicate that the first node hopes to be kept in the first RRC state.

In one embodiment, non-unicast traffics in the present application include multicast traffics.

In one embodiment, non-unicast traffics in the present application include groupcast traffics.

In one embodiment, non-unicast traffics in the present application include multicast group traffics.

In one embodiment, non-unicast traffics in the present application include broadcast traffics.

Embodiment 2

Figure 2:
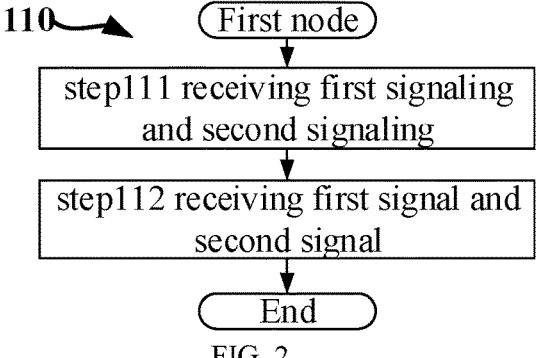
FIG. 2 illustrates a flowchart of processing of a first node according to another embodiment of the present application.

Embodiment 2 illustrates another flowchart of processing of a first node, as shown in FIG. 2. In 110 illustrated by FIG. 2, each box represents a step. In Embodiment 2, the first node in the present application receives a first signaling and a second signaling in step 111; and receives a first signal and a second signal in step 112.

In Embodiment 2, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the first signaling is a piece of Downlink Control Information (DCI).

In one embodiment, the second signaling is a DCI.

In one embodiment, the first signaling is used for scheduling the first signal.

In one embodiment, the second signaling is used for scheduling the second signal.

In one embodiment, a physical layer channel bearing the first signaling comprises a Physical Downlink Control Channel (PDCCH).

In one embodiment, a physical layer channel bearing the first signal comprises a Physical Downlink Shared Channel (PDSCH).

In one embodiment, a physical layer channel bearing the second signaling comprises a PDCCH.

In one embodiment, a physical layer channel bearing the second signal comprises a PDSCH.

In one embodiment, the first signal is a radio signal.

In one embodiment, the first signal is a baseband signal.

In one embodiment, the second signal is a radio signal.

In one embodiment, the second signal is a baseband signal.

In one embodiment, the first signaling is used to indicate time-domain resources occupied by the first signal.

In one embodiment, the first signaling is used to indicate frequency-domain resources occupied by the first signal.

In one embodiment, the second signaling is used to indicate time-domain resources occupied by the second signal.

In one embodiment, the second signaling is used to indicate frequency-domain resources occupied by the second signal.

In one embodiment, the sentence that "there exists overlapping time-domain resources between the time-domain resources occupied by the first signal and the time-domain resources occupied by the second signal" means that: the first signal and the second signal occupy a same slot.

In one embodiment, the sentence that "there exists overlapping time-domain resources between the time-domain resources occupied by the first signal and the time-domain resources occupied by the second signal" means that: there is at least one multicarrier symbol belonging to time-domain resources occupied by the first signal and time-domain resources occupied by the second signal simultaneously.

In one embodiment, the multicarrier symbol in the present application is an Orthogonal Frequency Division Multiplexing (OFDM) Symbol.

In one embodiment, the multicarrier symbol in the present application is a Cyclic Prefix-OFDM (CP-OFDM) symbol.

In one embodiment, the multicarrier symbol in the present application is a Discrete Fourier Transform Spread OFDM (DFT-S-OFDM) symbol.

In one embodiment, the multicarrier symbol in the present application is a Single Carrier-Frequency Division Multiple Access (SC-FDMA) symbol.

In one embodiment, the first field comprised by the first signaling is a Transmission Configuration Indication (TCI) field in a DCI.

In one embodiment, the second field comprised by the second signaling is a TCI field in a DCI.

In one embodiment, the first reference signal resource is associated with a TCI-State.

In one embodiment, the first reference signal resource comprises at least one of a Channel State Information-Reference Signal (CSI-RS) resource or a Synchronization Signal/physical broadcast channel Block (SSB).

In one embodiment, the second reference signal resource is associated with a TCI-State.

In one embodiment, the second reference signal resource comprises at least one of a CSI-RS resource or an SSB.

In one embodiment, the first reference signal resource indicated by the first field comprised by the first signaling is associated with at least one of a CSI-RS resource Identity or an SSB Index.

In one embodiment, the first reference signal resource indicated by the second field comprised by the second signaling is associated with at least one of a CSI-RS resource Identity or an SSB Index.

In one embodiment, the first reference signal resource and the second reference signal resource are respectively associated with different TCI-States.

In one embodiment, the first reference signal resource and the second reference signal resource are respectively associated with different TCI-StateIds.

In one embodiment, the first reference signal resource and the second reference signal resource are respectively associated with different CSI-RS resources.

In one embodiment, the first reference signal resource and the second reference signal resource are respectively associated with different SSB indexes.

In one embodiment, the sentence that "a priority of the first signal and a priority of the second signal are used to determine the target reference signal resource from the first reference signal resource and the second reference signal resource" means that: the priority of the first signal is higher than the priority of the second signal, where the target reference signal is the first reference signal; or the priority of the first signal is no higher than the priority of the second signal, where the target reference signal is the second reference signal.

In one embodiment, the sentence that "a priority of the first signal and a priority of the second signal are used to determine the target reference signal resource from the first reference signal resource and the second reference signal resource" means that: the priority of the first signal is no lower than the priority of the second signal, where the target reference signal is the first reference signal; or the priority of the first signal is lower than the priority of the second signal, where the target reference signal is the second reference signal.

In one embodiment, the sentence that "an RNTI for scrambling a CRC carried by the first signaling and an RNTI for scrambling a CRC carried by the second signaling are used to determine the target reference signal resource from the first reference signal resource and the second reference signal resource" means that: an RNTI for scrambling a CRC carried by the first signaling is an RNTI other than a C-RNTI, and an RNTI for scrambling a CRC carried by the second signaling is a C-RNTI, where the target reference signal is the first reference signal; an RNTI for scrambling a CRC carried by the first signaling and an RNTI for scrambling a CRC carried by the second signaling are both C-RNTIs, where the target reference signal is the second reference signal.

In one subembodiment, a time of transmitting the second signaling is later than a time of transmitting the first signaling.

In one embodiment, the first signaling and the second signaling occupy a same slot.

In one embodiment, the first signal and the second signal occupy a same slot.

In one embodiment, the first signaling is a Downlink (DL) Grant.

In one embodiment, the second signaling is a Downlink (DL) Grant.

Embodiment 3

Figure 3:
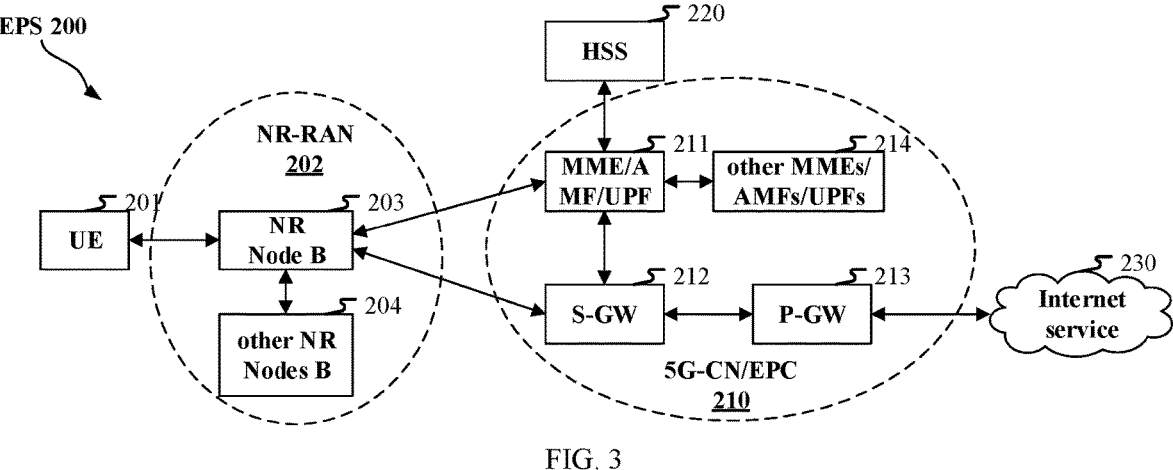
FIG. 3 illustrates a schematic diagram of a network architecture according to one embodiment of the present application.

Embodiment 3 illustrates a schematic diagram of a network architecture, as shown in FIG. 3.

FIG. 3 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other suitable terminology. The EPS 200 may comprise one UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 is a terminal with the capability of supporting multicast/groupcast traffics.

In one embodiment, the UE 201 supports PTM transmission.

In one embodiment, the UE 201 supports SC-PTM transmission.

In one embodiment, the UE 201 supports transmitting multicast groupcast traffics through a unicast channel.

In one embodiment, the UE 201 supports transmitting multicast groupcast data through a unicast channel.

In one embodiment, the gNB203 corresponds to the second node in the present application.

In one embodiment, the gNB203 is a base station with the capability of supporting multicast/groupcast traffics.

In one embodiment, the gNB203 supports PTM transmission.

In one embodiment, the gNB203 supports SC-PTM transmission.

In one embodiment, the UE 201 supports transmitting multicast groupcast traffics through a unicast channel.

In one embodiment, the UE 201 supports transmitting multicast groupcast data through a unicast channel.

Embodiment 4

Figure 4:
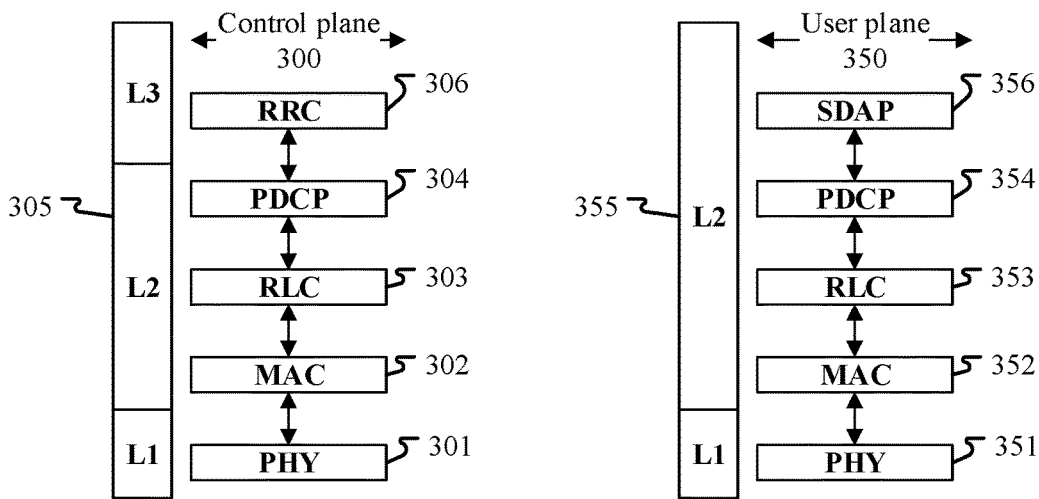
FIG. 4 illustrates a schematic diagram of a radio protocol architecture of a user plane and a control plane according to one embodiment of the present application.

Embodiment 4 illustrates a schematic diagram of a radio protocol architecture of a user plane and a control plane according to the present application, as shown in FIG. 4. FIG. 4 is a schematic diagram illustrating an embodiment of a radio protocol architecture of a user plane 350 and a control plane 300. In FIG. 4, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and also provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The Radio Resource Control (RRC) sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 4 is applicable to the first node in the present application.

In one embodiment, the radio protocol architecture in FIG. 4 is applicable to the second node in the present application.

In one embodiment, the PDCP304 of the second communication node is used for generating scheduling of the first communication node.

In one embodiment, the PDCP354 of the second communication node is used for generating scheduling of the first communication node.

In one embodiment, the first timer in the present application is in a MAC layer.

In one embodiment, the first timer in the present application is in an RLC layer.

In one embodiment, the first timer in the present application is in an RRC layer.

In one embodiment, the first message in the present application is generated by the PHY301 or the PHY351.

In one embodiment, the first message in the present application is generated by the MAC302 or the MAC352.

In one embodiment, the first message in the present application is generated by the RRC306.

In one embodiment, the first signaling in the present application is generated by the PHY301 or the PHY351.

In one embodiment, the first signaling in the present application is generated by the MAC302 or the MAC352.

In one embodiment, the second signaling in the present application is generated by the PHY301 or the PHY351.

In one embodiment, the second signaling in the present application is generated by the MAC302 or the MAC352.

In one embodiment, the first signal in the present application is generated by the PHY301 or the PHY351.

In one embodiment, the first signal in the present application is generated by the MAC302 or the MAC352.

In one embodiment, the first signal in the present application is generated by the RRC306.

In one embodiment, the second signal in the present application is generated by the PHY301 or the PHY351.

In one embodiment, the second signal in the present application is generated by the MAC302 or the MAC352.

In one embodiment, the second signal in the present application is generated by the RRC306.

In one embodiment, the target data in the present application is generated by the PHY301 or the PHY351.

In one embodiment, the target data in the present application is generated by the MAC302 or the MAC352.

In one embodiment, the target data in the present application is generated by the RRC306.

In one embodiment, the uplink data in the present application is generated by the PHY301 or the PHY351.

In one embodiment, the uplink data in the present application is generated by the MAC302 or the MAC352.

In one embodiment, the uplink data in the present application is generated by the RRC306.

In one embodiment, the second message in the present application is generated by the PHY301 or the PHY351.

In one embodiment, the second message in the present application is generated by the MAC302 or the MAC352.

In one embodiment, the second message in the present application is generated by the RRC306.

In one embodiment, the third message in the present application is generated by the PHY301 or the PHY351.

In one embodiment, the third message in the present application is generated by the MAC302 or the MAC352.

In one embodiment, the third message in the present application is generated by the RRC306.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used for managing multiple base stations.

In one embodiment, the second node is used for managing multiple nodes of cells.

In one embodiment, the second node is used for managing multiple TRPs.

In one embodiment, the second node is a Multicell/Multicast Coordination Entity (MCE).

Embodiment 5

Figure 5:
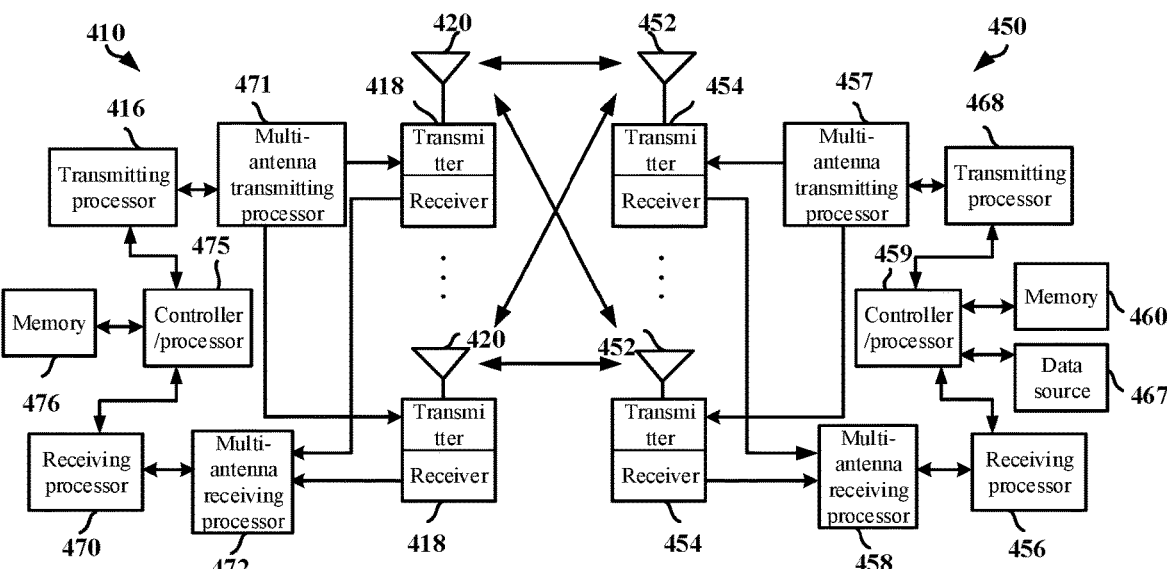
FIG. 5 illustrates a schematic diagram of a first communication device and a second communication device according to one embodiment of the present application.

Embodiment 5 illustrates a schematic diagram of a first communication device and a second communication device according to the present application, as shown in FIG. 5. FIG. 5 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: firstly maintains a first timer; and then transmits a first message, as a response to any condition in a first condition set being satisfied; a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the first communication node 450 comprises a memory that stores a computer readable instruction program, the computer readable instruction program generates actions when executed by at least one processor, which include: firstly maintaining a first timer; and then transmitting a first message, as a response to any condition in a first condition set being satisfied; a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: firstly receives a first signaling and a second signaling; and then receives a first signal and a second signal; the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the first communication node 450 comprises a memory that stores a computer readable instruction program, the computer readable instruction program generates actions when executed by at least one processor, which include: firstly receiving a first signaling and a second signaling; and then receiving a first signal and a second signal; the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: receives a first message; a transmitter of the first message includes the first communication device 450, the first communication device 450 maintains a first timer, and as a response to any condition in a first condition set being satisfied, the first communication device 450 transmits a first message; a condition in the first condition set is that the first timer is expired; the first message is used for indicating at least one non-unicast identifier; the first communication device 450 is in a first RRC state when transmitting the first message; the first RRC state is an RRC connected state, or the first RRC state is an RRC inactive state.

In one embodiment, the second communication device 410 comprises a memory that stores a computer readable instruction program, the computer readable instruction program generates actions when executed by at least one processor, which include: receiving a first message; a transmitter of the first message includes the first communication device 450, the first communication device 450 maintains a first timer, and as a response to any condition in a first condition set being satisfied, the first communication device 450 transmits a first message; a condition in the first condition set is that the first timer is expired; the first message is used for indicating at least one non-unicast identifier; the first communication device 450 is in a first RRC state when transmitting the first message; the first RRC state is an RRC connected state, or the first RRC state is an RRC inactive state.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first signaling and a second signaling; and transmits a first signal and a second signal; the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the second communication device 410 comprises a memory that stores a computer readable instruction program, the computer readable instruction program generates actions when executed by at least one processor, which include: transmitting a first signaling and a second signaling; and transmitting a first signal and a second signal; the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is network equipment.

In one embodiment, the second communication device 410 is a serving cell.

In one embodiment, the second communication device 410 is a TRP.

In one embodiment, at least the first four of the antenna 452, the receiver 454, the multi-antenna receiving processor 458, the receiving processor 456, and the controller/processor 459 are used for maintaining a first timer.

In one embodiment, at least the first four of the antenna 452, the transmitter 454, the multi-antenna transmitting processor 457, the transmitting processor 468 and the controller/processor 459 are used for maintaining a first timer.

In one embodiment, at least the first four of the antenna 452, the transmitter 454, the multi-antenna transmitting processor 457, the transmitting processor 468 and the controller/processor 459 are used for transmitting a first message; at least the first four of the antenna 420, the receiver 418, the multi-antenna receiving processor 472, the receiving processor 470 and the controller/processor 475 are used for receiving a first message.

In one embodiment, at least the first four of the antenna 452, the receiver 454, the multi-antenna receiving processor 458, the receiving processor 456, and the controller/processor 459 are used for receiving a first signaling and a second signaling; at least the first four of the antenna 420, the transmitter 418, the multi-antenna transmitting processor 471, the transmitting processor 416 and the controller/processor 475 are used for transmitting a first signaling and a second signaling.

In one embodiment, at least the first four of the antenna 452, the receiver 454, the multi-antenna receiving processor 458, the receiving processor 456, and the controller/processor 459 are used for receiving a first signal and a second signal; at least the first four of the antenna 420, the transmitter 418, the multi-antenna transmitting processor 471, the transmitting processor 416 and the controller/processor 475 are used for transmitting a first signal and a second signal.

In one embodiment, at least the first four of the antenna 452, the receiver 454, the multi-antenna receiving processor 458, the receiving processor 456, and the controller/processor 459 are used for receiving target data; at least the first four of the antenna 420, the transmitter 418, the multi-antenna transmitting processor 471, the transmitting processor 416 and the controller/processor 475 are used for transmitting target data.

In one embodiment, at least the first four of the antenna 452, the transmitter 454, the multi-antenna transmitting processor 457, the transmitting processor 468 and the controller/processor 459 are used for transmitting uplink data; at least the first four of the antenna 420, the receiver 418, the multi-antenna receiving processor 472, the receiving processor 470 and the controller/processor 475 are used for receiving uplink data.

In one embodiment, at least the first four of the antenna 452, the receiver 454, the multi-antenna receiving processor 458, the receiving processor 456, and the controller/processor 459 are used for monitoring a second message; at least the first four of the antenna 420, the transmitter 418, the multi-antenna transmitting processor 471, the transmitting processor 416 and the controller/processor 475 are used for transmitting a second message.

In one embodiment, at least the first four of the antenna 452, the receiver 454, the multi-antenna receiving processor 458, the receiving processor 456, and the controller/processor 459 are used for determining whether to enter into an RRC idle state according to whether the second message is detected.

In one embodiment, at least the first four of the antenna 452, the receiver 454, the multi-antenna receiving processor 458, the receiving processor 456, and the controller/processor 459 are used for switching from a first BWP to a second BWP; at least the first four of the antenna 420, the transmitter 418, the multi-antenna transmitting processor 471, the transmitting processor 416 and the controller/processor 475 are used for determining a switch of the first communication device 450 from a first BWP to a second BWP.

In one embodiment, at least the first four of the antenna 452, the receiver 454, the multi-antenna receiving processor 458, the receiving processor 456, and the controller/processor 459 are used for monitoring a third message; at least the first four of the antenna 420, the transmitter 418, the multi-antenna transmitting processor 471, the transmitting processor 416 and the controller/processor 475 are used for transmitting a third message.

In one embodiment, at least the first four of the antenna 452, the receiver 454, the multi-antenna receiving processor 458, the receiving processor 456, and the controller/processor 459 are used for determining whether to be camped on the second BWP according to whether the third message is detected.

Embodiment 6

Figure 6:
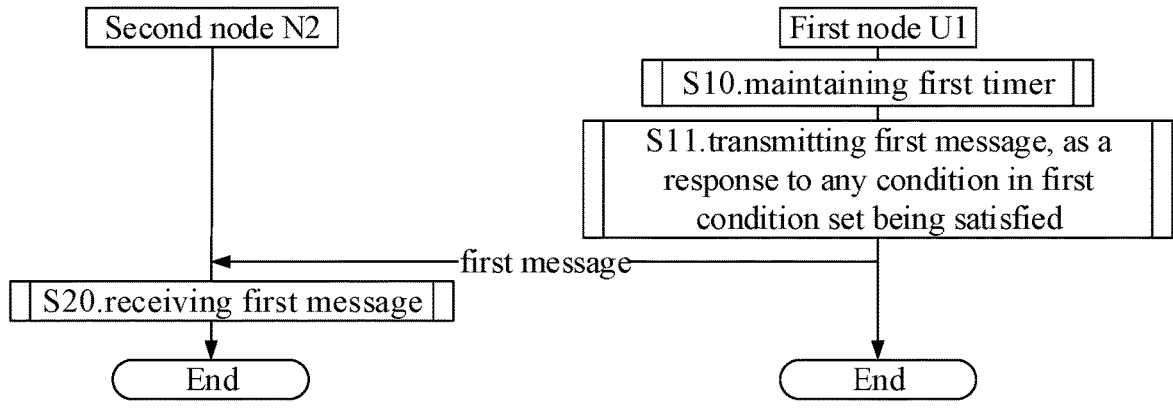
FIG. 6 illustrates a flowchart of a first message according to one embodiment of the present application.

Embodiment 6 illustrates a flowchart of a first message, as shown in FIG. 6. In FIG. 6, a first node U1 and a second node N2 are in communication via a radio link. It should be particularly noted that the sequence illustrated herein does not set any limit to the signal transmission order or implementation order in the present application. The first node U1 maintains a first timer in step S10; and transmits a first message in step S11, as a response to any condition in a first condition set being satisfied.

The second node N2 receives a first message in step S20.

In Embodiment 6, a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the receiving includes blind detection.

In one embodiment, the receiving includes demodulation.

In one embodiment, the receiving includes energy detection.

In one embodiment, the receiving includes coherent detection.

In one embodiment, the second node N2 is not aware that the first node U1 transmits the first message before receiving the first message.

Embodiment 7

Figures 7, 8, 9, 10:
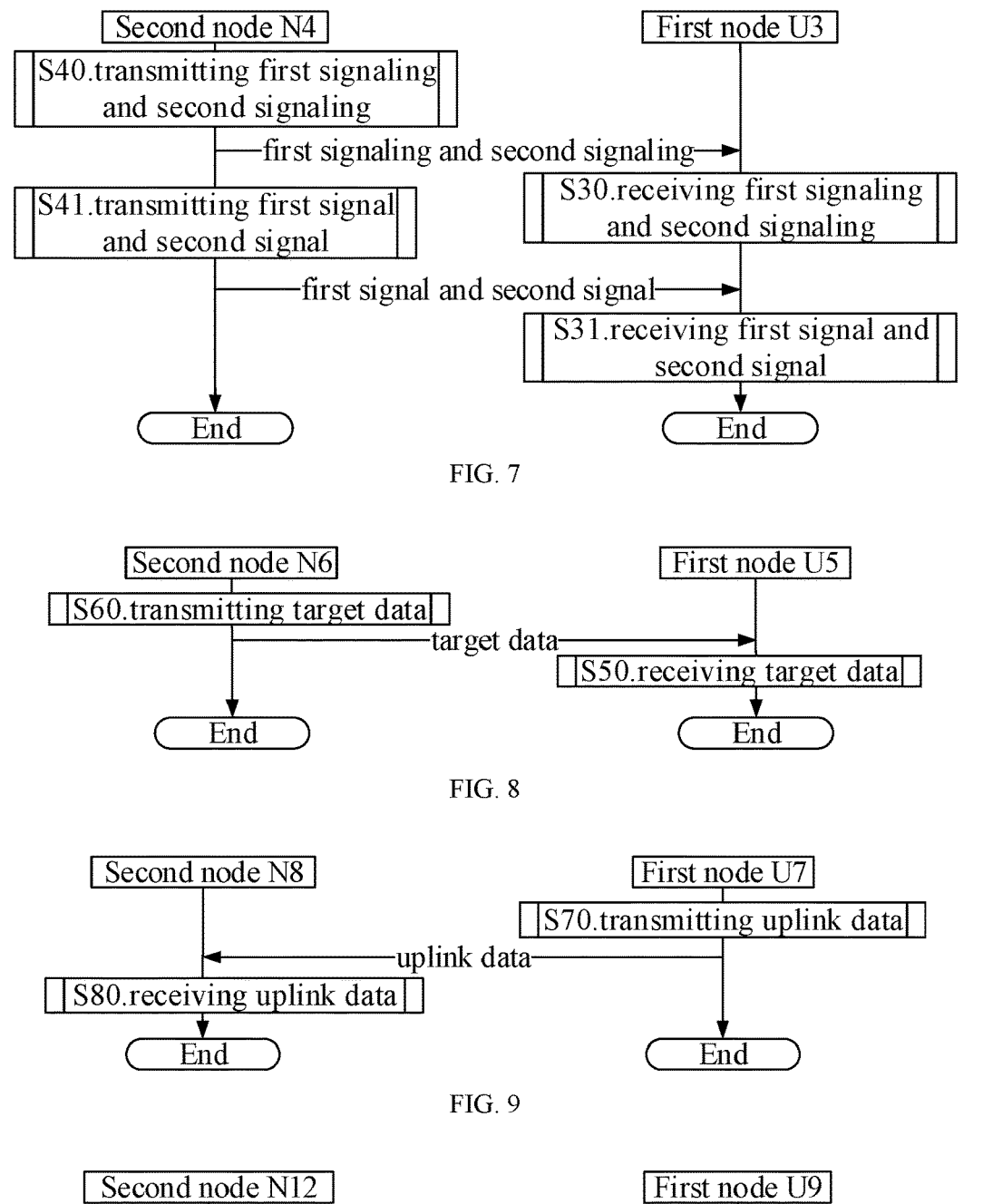
FIG. 7 illustrates a flowchart of a first signaling and a second signaling according to one embodiment of the present application.
FIG. 8 illustrates a flowchart of target data according to one embodiment of the present application.
FIG. 9 illustrates a flowchart of uplink data according to one embodiment of the present application.
FIG. 10 illustrates a flowchart of a second message according to one embodiment of the present application.

Embodiment 7 illustrates a flowchart of a first signaling and a second signaling according to one embodiment of the present application, as shown in FIG. 7. In FIG. 7, a first node U3 and a second node N4 are in communication via a radio link; It should be particularly noted that the sequence illustrated herein does not set any limit to the signal transmission order or implementation order in the present application.

The first node U3 receives a first signaling and a second signaling in step S30; and receives a first signal and a second signal in step S31.

The second node N4 transmits a first signaling and a second signaling in step S40; and transmits a first signal and a second signal in step S41.

In Embodiment 7, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, the step S30 is taken after the step S11 in Embodiment 6.

In one embodiment, the step S40 is taken after the step S20 in Embodiment 6.

In one embodiment, the step S30 is taken before the step S10 in Embodiment 6.

In one embodiment, the step S40 is taken before the step S20 in Embodiment 6.

Embodiment 8

Embodiment 8 illustrates a flowchart of target data according to one embodiment of the present application, as shown in FIG. 8. In FIG. 8, a first node U5 and a second node N6 are in communication via a radio link. It should be particularly noted that the sequence illustrated herein does not set any limit to the signal transmission order or implementation order in the present application.

The first node U5 receives target data in step S50.

The second node N6 transmits target data in step S60.

In Embodiment 8, the action of maintaining a first timer comprises: as a response to receiving the target data, starting or restarting the first timer; the target data comprises a MAC SDU from a DTCH, or a DCCH, or a CCCH.

In one embodiment, the step S50 is taken before the step S10 in Embodiment 6.

In one embodiment, the step S60 is taken before the step S20 in Embodiment 6.

In one embodiment, the target data does not comprise a MAC SDU from a MTCH.

In one embodiment, the target data does not comprise a MAC SDU from a MCCH.

In one embodiment, the target data does not comprise a MAC SDU from a SC-MTCH.

In one embodiment, the target data does not comprise a MAC SDU from a SC-MCCH.

In one embodiment, the target data does not comprise any MAC SDU from a MTCH, a MCCH, a SC-MTCH or a SC-MCCH.

In one embodiment, the target data is unicast data.

Embodiment 9

Embodiment 9 illustrates a flowchart of uplink data, as shown in FIG. 9. In FIG. 9, a first node U7 and a second node N8 are in communication via a radio link; It should be particularly noted that the sequence illustrated herein does not set any limit to the signal transmission order or implementation order in the present application.

The first node U7 transmits uplink data in step S70.

The second node N8 receives uplink data in step S80.

In Embodiment 9, the action of maintaining a first timer comprises: as a response to transmitting the uplink data, starting or restarting the first timer; the uplink data comprises a MAC SDU from a DTCH or a DCCH.

In one embodiment, the step S70 is taken before the step S10 in Embodiment 6.

In one embodiment, the step S80 is taken before the step S20 in Embodiment 6.

In one embodiment, the uplink data is unicast data.

Embodiment 10

Embodiment 10 illustrates a flowchart of a second message, as shown in FIG. 10. In FIG. 10, a first node U9 and a second node N12 are in communication via a radio link. It should be particularly noted that the sequence illustrated herein does not set any limit to the signal transmission order or implementation order in the present application.

The first node U9 monitors a second message in a first time window in step S90; and determines in step S91 whether to enter into an RRC idle state according to whether the second message is detected.

The second node N12 transmits a second message in step S120.

In Embodiment 10, an expiration of the first timer is used to trigger a transmission of the first message; a time of transmitting the first message is used to determine the first time window; the action of determining whether to enter into an RRC idle state according to whether the second message is detected comprises: not entering the RRC idle state when the second message is detected, or entering the RRC idle state when the second message is not detected.

In one embodiment, the step S90 is after the step S11 in Embodiment 6.

In one embodiment, the step S120 is after the step S20 in Embodiment 6.

In one embodiment, the step S91 comprises detecting the second message and determining to enter into an RRC idle state.

In one embodiment, the second message is a response to the first message.

Embodiment 11

Figure 11:
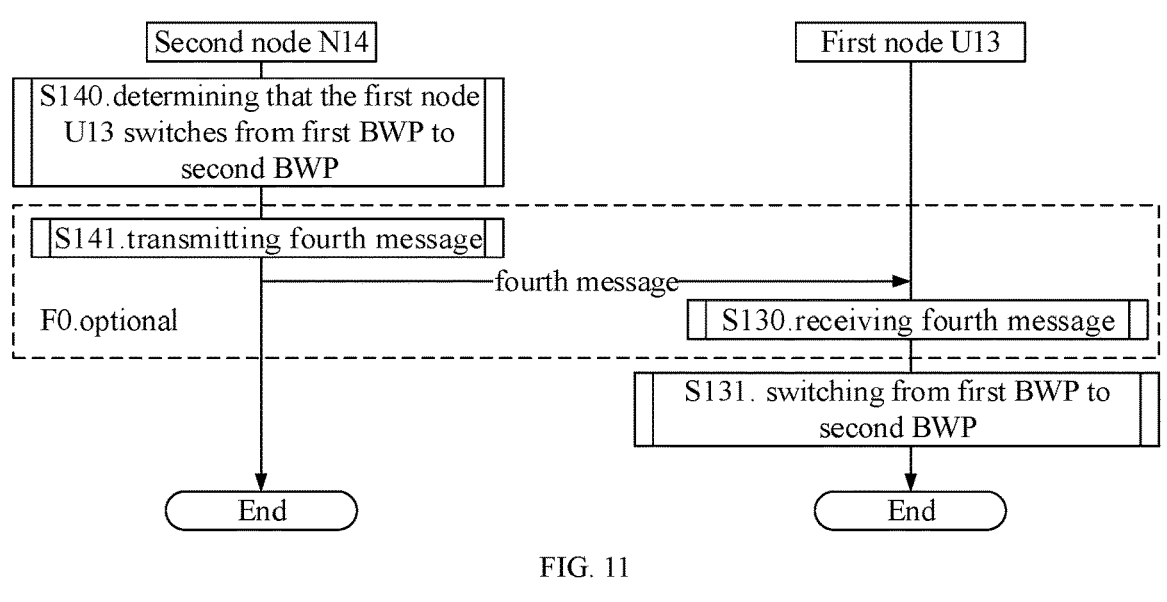
FIG. 11 illustrates a flowchart of a switch from a first BWP to a second BWP according to one embodiment of the present application.

Embodiment 11 illustrates a flowchart of a switch from a first BWP to a second BWP according to one embodiment of the present application, as shown in FIG. 11. In FIG. 11, a first node U13 and a second node N14 are in communication via a radio link; It should be particularly noted that the sequence illustrated herein does not set any limit to the signal transmission order or implementation order in the present application; Herein, the step S130 and the step S140 in the box F0 are optional.

The first node U13 receives a fourth message in step S130; and switches from a first BWP to a second BWP in step S131.

The second node N14 determines in step S140 that the first node U13 switches from the first BWP to the second BWP; and transmits a fourth message in step S141.

In Embodiment 11, the action of maintaining a first timer comprises: as a response to the action of switching from the first BWP to the second BWP, starting or maintaining the first timer.

In one embodiment, the step S131 is taken before the step S10 in Embodiment 6.

In one embodiment, the step S141 is taken before the step S20 in Embodiment 6.

In one embodiment, the non-unicast identifier is applied in a data transmission on the first BWP.

In one embodiment, the non-unicast identifier is not applied in a data transmission on the second BWP.

In one embodiment, the action of starting the first timer means: starting the first timer to begin time counting.

In one embodiment, the action of maintaining the first timer means: maintaining the first timer to continue time counting.

In one embodiment, between the first BWP and the second BWP only the first BWP comprises frequency-domain resources used for Multicast Broadcast Services (MBS).

In one embodiment, between the first BWP and the second BWP only the first BWP comprises frequency-domain resources used for MBS.

In one embodiment, between the first BWP and the second BWP only the first BWP comprises frequency-domain resources used for PTM.

In one embodiment, between the first BWP and the second BWP only the first BWP comprises frequency-domain resources used for PTM.

In one embodiment, the second BWP is configured to be used for unicast transmission.

In one embodiment, when a second timer is expired, the first node switches from the first BWP to the second BWP.

In one embodiment, a physical-layer dynamic signaling is used to indicate that the first node switches from the first BWP to the second BWP.

In one embodiment, the second BWP is configured by a UE-specific RRC signaling.

In one embodiment, the fourth message is borne by a physical-layer dynamic signaling.

In one embodiment, the fourth message is from an RRC layer or an RLC layer of the first node U13.

Embodiment 12

Figure 12:
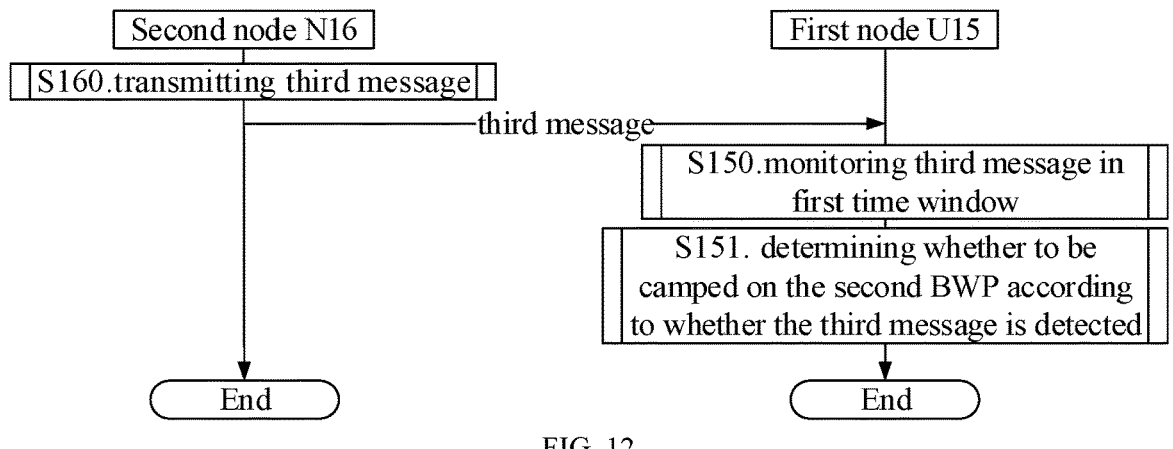
FIG. 12 illustrates a flowchart of a third message according to one embodiment of the present application.

Embodiment 12 illustrates a flowchart of a third message, as shown in FIG. 12. In FIG. 12, a first node U15 and a second node N16 are in communication via a radio link; It should be particularly noted that the sequence illustrated herein does not set any limit to the signal transmission order or implementation order in the present application.

The first node U15 monitors a third message in a first time window in step S150; and determines in step S151 whether to be camped on the second BWP according to whether the third message is detected.

The second node N16 transmits a third message in step S160.

In Embodiment 12, an expiration of the first timer is used to trigger a transmission of the first message; a time of transmitting the first message is used to determine the first time window; the action of determining whether to be camped on the second BWP according to whether the third message is detected comprises: not being camped on the second BWP when the third message is detected, or being camped on the second BWP when the third message is detected.

In one embodiment, the step S150 is after the step S11 in Embodiment 6.

In one embodiment, the step S160 is after the step S20 in Embodiment 6.

In one embodiment, the step 151 comprises detecting the third message and determining not to be camped on the second BWP.

In one embodiment, the third message comprises DCI.

In one embodiment, the third message comprises an RRC signaling.

In one embodiment, the third message comprises a MAC CE.

In one embodiment, a physical layer channel bearing the third message comprises a PDCCH.

In one embodiment, a physical layer channel bearing the third message comprises a PDSCH.

In one embodiment, the third message comprises a Bandwidth Part Indicator field in a DCI.

In one embodiment, the third message comprises a BWP-id in TS 38.331.

In one embodiment, the third message comprises a BWP-downlink in TS 38.331.

In one embodiment, when having detected the third message, the first node U15 is switched to a third BWP according to an indication of the second message.

In one subembodiment, the third BWP is the first BWP.

In one subembodiment, the third BWP is a BWP other than the first BWP.

In one subembodiment, the third BWP is configured by an RRC signaling other than a UE-specific RRC signaling.

In one subembodiment, the third BWP is used for non-unicast traffics.

In one subembodiment, the third BWP is associated with a BWP identifier for multicast groupcast.

In one embodiment, non-unicast traffics in the present application include multicast group traffics.

In one embodiment, non-unicast traffics in the present application include broadcast traffics.

In one embodiment, non-unicast traffics in the present application are transmitted on a non-unicast channel.

In one subembodiment, the non-unicast channel includes a MTCH.

In one subembodiment, the non-unicast channel includes a MCCH.

In one subembodiment, the non-unicast channel includes a PDCCH by which a CRC carried is scrambled by the first identifier.

In one subembodiment, the non-unicast channel includes a PDSCH by which a CRC carried is scrambled by the first identifier.

In one embodiment, the third message is a response to the first message.

Embodiment 13

Figure 13:
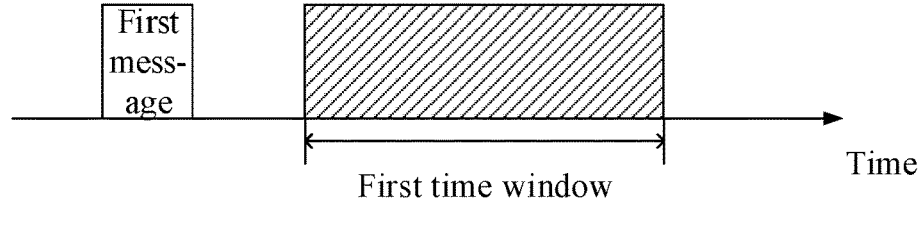
FIG. 13 illustrates a schematic diagram of a first time window according to one embodiment of the present application.

Embodiment 13 illustrates a schematic diagram of a first time window according to one embodiment of the present application, as shown in FIG. 13. In FIG. 13, a time of transmitting the first message is used to determine the first time window; the first time window occupies a positive integer number of consecutive slots in time domain.

In one embodiment, a start time of transmitting the first message is used to determine a start of the first time window.

In one embodiment, an end time of transmitting the first message is used to determine a start of the first time window.

In one embodiment, a duration of the first time window in time domain is fixed.

In one embodiment, a duration of the first time window in time domain is configured by a higher layer signaling.

Embodiment 14

Figure 14:
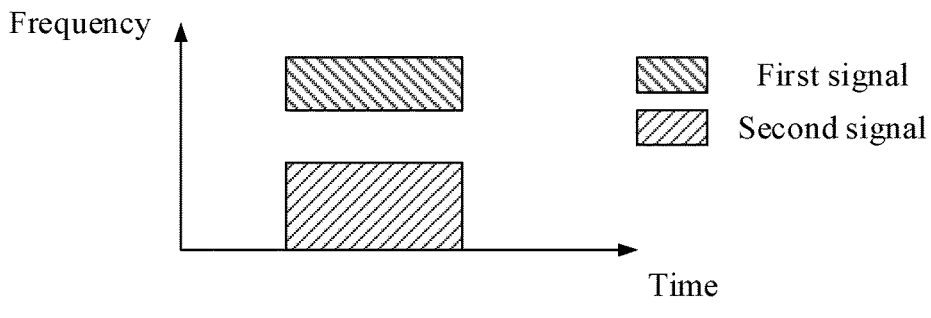
FIG. 14 illustrates a schematic diagram of a first signal and a second signal according to one embodiment of the present application.

Embodiment 14 illustrates a schematic diagram of a first signal and a second signal, as shown in FIG. 14. In FIG. 14, the first signal and the second signal are FDM.

In one embodiment, the first signal is generated by a Transport Block (TB).

In one embodiment, the second signal is generated by a TB.

In one embodiment, a CRC comprised by the first signal is scrambled by an RNTI other than a C-RNTI.

In one embodiment, a CRC comprised by the first signal is scrambled by a G-RNTI.

In one embodiment, a CRC comprised by the first signal is scrambled by a C-RNTI.

Embodiment 15

Embodiment 15 illustrates a schematic diagram of a first-type reference signal resource set and a second-type reference signal resource set, as shown in FIG. 15. In FIG. 15, the first-type reference signal resource set comprises K1 first-type reference signal resources, and the second-type reference signal resource set comprises K2 second-type reference signal resources; the K1 first-type reference signal resources respectively correspond to K1 beams, while the K2 second-type reference signal resources respectively correspond to K2 beams; K1 is a positive integer greater than 1, and K2 is a positive integer greater than 1.

In one embodiment, the target control resource set in the present application is a CORESET.

In one embodiment, the first field comprised by the first signaling is used for indicating the first reference signal resource in the K1 first-type reference signal resources.

In one embodiment, any first-type reference signal resource of the K1 first-type reference signal resources comprises at least one of a CSI-RS resource or an SSB.

In one embodiment, any first-type reference signal resource of the K1 first-type reference signal resources is associated with one TCI-State.

In one embodiment, any first-type reference signal resource of the K1 first-type reference signal resources is associated with one TCI-StateID.

In one embodiment, any first-type reference signal resource of the K1 first-type reference signal resources is associated with at least one of a CSI-RS resource identifier or an SSB index.

In one embodiment, the second field comprised by the second signaling is used for indicating the second reference signal resource in the K2 second-type reference signal resources.

In one embodiment, any second-type reference signal resource of the K2 second-type reference signal resources comprises at least one of a CSI-RS resource or an SSB.

In one embodiment, any second-type reference signal resource of the K2 second-type reference signal resources is associated with one TCI-State.

In one embodiment, any second-type reference signal resource of the K2 second-type reference signal resources is associated with one TCI-StateID.

In one embodiment, any second-type reference signal resource of the K2 second-type reference signal resources is associated with at least one of a CSI-RS resource identifier or an SSB index.

Embodiment 16

Embodiment 16 illustrates a schematic diagram of a first control resource set and a second control resource set, as shown in FIG. 16. In FIG. 16, there exists overlapping frequency-domain resources between frequency-domain resources occupied by the first control resource set and frequency-domain resources occupied by the second control resource set.

In one embodiment, a search space set associated with the first control resource set is associated with the first identifier, while a search space set associated with the second control resource set is not associated with the first identifier; a demodulation reference signal of a control signaling in the second control resource set and a demodulation reference signal of a control signaling in the first control resource set are Quasi Co-located (QCL).

In one embodiment, the first control resource set is a CORESET.

In one embodiment, the second control resource set is a CORESET.

In one embodiment, the first identifier is a SearchSpaceID.

In one embodiment, the first identifier is associated with non-unicast traffic transmission.

In one embodiment, the first identifier is a BWP-id of a BWP supporting non-unicast traffic transmission.

Embodiment 17

Embodiment 17 illustrates a structure block diagram of a first node, as shown in FIG. 17. In FIG. 17, a first node 1700 comprises a first transceiver 1701 and a second transceiver 1702.

The first transceiver 1701 maintains a first timer;

the second transceiver 1702 transmits a first message, as a response to any condition in a first condition set being satisfied.

In Embodiment 17, a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the first transceiver 1701 receives target data; the action of maintaining a first timer comprises: as a response to receiving the target data, starting or restarting the first timer; the target data comprises a MAC SDU from a DTCH, or a DCCH, or a CCCH.

In one embodiment, the first transceiver 1701 transmits uplink data; the action of maintaining a first timer comprises: as a response to transmitting the uplink data, starting or restarting the first timer; the target data comprises a MAC SDU from a DTCH or a DCCH.

In one embodiment, the second transceiver 1702 monitors a second message in a first time window, and the second transceiver 1702 determines whether to enter an RRC idle state according to whether the second message is detected; an expiration of the first timer is used to trigger a transmission of the first message; a time of transmitting the first message is used to determine the first time window; the action of determining whether to enter into an RRC idle state according to whether the second message is detected comprises: not entering the RRC idle state when the second message is detected, or entering the RRC idle state when the second message is not detected.

In one embodiment, the first transceiver 1701 switches from a first BWP to a second BWP; the action of maintaining a first timer comprises: as a response to the action of switching from the first BWP to the second BWP, starting or maintaining the first timer.

In one embodiment, the second transceiver 1702 monitors a third message in a first time window, and the second transceiver 1702 determines whether to be camped on the second BWP according to whether the third message is detected; an expiration of the first timer is used to trigger a transmission of the first message; a time of transmitting the first message is used to determine the first time window; the action of determining whether to be camped on the second BWP according to whether the third message is detected comprises: not being camped on the second BWP when the third message is detected, or being camped on the second BWP when the third message is detected.

In one embodiment, the first transceiver 1701 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the second transceiver 1702 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

Embodiment 18

Embodiment 18 illustrates a structure block diagram of a first node, as shown in FIG. 18. In FIG. 18, a first node 1800 comprises a first transceiver 1801 and a second transceiver 1802.

The first transceiver 1801 receives a first signaling and a second signaling;

the second transceiver 1802 receives a first signal and a second signal.

In Embodiment 18, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, frequency-domain resources occupied by the first signal is a first subcarrier set, while frequency-domain resources occupied by the second signal is a second subcarrier set, the first subcarrier set and the second subcarrier set belonging to a target BWP, and the first subcarrier set being orthogonal with the second subcarrier set in frequency domain.

In one subembodiment, the first subcarrier set comprises more than one subcarrier.

In one subembodiment, the second subcarrier set comprises more than one subcarrier.

In one embodiment, both frequency-domain resources occupied by the first signaling and frequency-domain resources occupied by the second signaling belong to a target control resource set, the target control resource set being associated with a first-type reference signal resource set and a second-type reference signal resource set; the first field comprised by the first signaling is used to indicate the first reference signal resource in the first-type reference signal resource set; the second field comprised by the second signaling is used to indicate the second reference signal resource in the second-type reference signal resource set.

In one embodiment, frequency-domain resources occupied by the first signaling and frequency-domain resources occupied by the second signaling respectively belong to a first control resource set and a second control resource set, where there exists overlapping frequency-domain resources between frequency-domain resources occupied by the first control resource set and frequency-domain resources occupied by the second control resource set; a search space set associated with the first control resource set is associated with the first identifier, while a search space set associated with the second control resource set is not associated with the first identifier; a demodulation reference signal of a control signaling in the second control resource set and a demodulation reference signal of a control signaling in the first control resource set are Quasi Co-located (QCL).

In one subembodiment, the first identifier is an integer.

In one subembodiment, the first identifier is a CORESET Pool ID.

In one embodiment, the first transceiver 1801 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the second transceiver 1802 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

Embodiment 19

Embodiment 19 illustrates a structure block diagram of a second node, as shown in FIG. 19. In FIG. 19, a second node 1900 comprises a third transceiver 1901.

The third transceiver 1901 receives a first message.

In Embodiment 19, a transmitter of the first message includes a first node, the first node maintaining a first timer, and as a response to any condition in a first condition set being satisfied, the first node transmits a first message; a condition in the first condition set is that the first timer is expired; the first message is used for indicating at least one non-unicast identifier; the first node is in a first RRC state when transmitting the first message; the first RRC state is an RRC connected state, or the first RRC state is an RRC inactive state.

In one embodiment, the third transceiver 1901 transmits target data; the first node receives the target data; the action of maintaining a first timer comprises: as a response to receiving the target data, the first node starts or restarts the first timer; the target data comprises a MAC SDU from a DTCH, or a DCCH, or a CCCH.

In one embodiment, the third transceiver 1901 receives uplink data; the first node transmits the uplink data; the action of maintaining a first timer comprises: as a response to transmitting the uplink data, the first node starts or restarts the first timer; the uplink data comprises a MAC SDU from a DTCH or a DCCH.

In one embodiment, the third transceiver 1901 transmits a second message in a first time window; the first node determines whether to enter into an RRC idle state according to whether the second message is detected; an expiration of the first timer is used to trigger that the first node transmits the first message; a time of transmitting the first message is used to determine the first time window; the action of determining whether to enter into an RRC idle state according to whether the second message is detected comprises: the first node not entering the RRC idle state when detecting the second message, or the first node entering the RRC idle state when not detecting the second message.

In one embodiment, the third transceiver 1901 determines that the first node is switched from a first BWP to a second BWP; the action of maintaining a first timer comprises: as a response to the action of switching from the first BWP to the second BWP, the first node starting or maintaining the first timer.

In one embodiment, the third transceiver 1901 transmits a third message in a first time window; the first node determines whether to be camped on the second BWP according to whether the third message is detected; an expiration of the first timer is used to trigger that the first node transmits the first message; a time of transmitting the first message is used to determine the first time window; the action of determining whether to be camped on the second BWP according to whether the third message is detected comprises: the first node not being camped on the second BWP when the third message is detected, or the first node being camped on the second BWP when the third message is detected.

In one embodiment, the third transceiver 1901 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

Embodiment 20

Embodiment 20 illustrates a structure block diagram of a second node, as shown in FIG. 20. In FIG. 20, a second node 2000 comprises a third transceiver 2001.

The third transceiver 2001 transmits a first signaling and a second signaling; and transmits a first signal and a second signal.

In Embodiment 20, the first signaling is used to determine at least one of time-domain resources or frequency-domain resources occupied by the first signal, while the second signaling is used to determine at least one of time-domain resources or frequency-domain resources occupied by the second signal; there exists overlapping time-domain resources between the time-domain resources occupied by the first signal and the time-domain resources occupied by the second signal; the first signaling comprises a first field, the first field being used to indicate a first reference signal resource; the second signaling comprises a second field, the second field being used to indicate a second reference signal resource; the first reference signal resource is different from the second reference signal resource; a demodulation reference signal (DMRS) of a channel occupied by the first signal is Quasi Co-located (QCL) with a target reference signal resource, and a demodulation reference signal of a channel occupied by the second signal is QCL with the target reference signal resource; the target reference signal resource is one of the first reference signal resource or the second reference signal resource; a priority of the first signal and a priority of the second signal are used to determine the target reference signal resource from the first reference signal resource and the second reference signal resource, or, an RNTI for scrambling a CRC carried by the first signaling and an RNTI for scrambling a CRC carried by the second signaling are used to determine the target reference signal resource from the first reference signal resource and the second reference signal resource.

In one embodiment, frequency-domain resources occupied by the first signal is a first subcarrier set, while frequency-domain resources occupied by the second signal is a second subcarrier set, the first subcarrier set and the second subcarrier set belonging to a target BWP, and the first subcarrier set being orthogonal with the second subcarrier set in frequency domain.

In one embodiment, both frequency-domain resources occupied by the first signaling and frequency-domain resources occupied by the second signaling belong to a target control resource set, the target control resource set being associated with a first-type reference signal resource set and a second-type reference signal resource set; the first field comprised by the first signaling is used to indicate the first reference signal resource in the first-type reference signal resource set; the second field comprised by the second signaling is used to indicate the second reference signal resource in the second-type reference signal resource set.

In one embodiment, frequency-domain resources occupied by the first signaling and frequency-domain resources occupied by the second signaling respectively belong to a first control resource set and a second control resource set, where there exists overlapping frequency-domain resources between frequency-domain resources occupied by the first control resource set and frequency-domain resources occupied by the second control resource set; a search space set associated with the first control resource set is associated with the first identifier, while a search space set associated with the second control resource set is not associated with the first identifier; a demodulation reference signal of a control signaling in the second control resource set and a demodulation reference signal of a control signaling in the first control resource set are Quasi Co-located (QCL).

In one embodiment, the third transceiver 2001 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the fourth transceiver 2002 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present application includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:
   a transceiver configured to maintain a first timer and transmit
   a first message, as a response to any condition in a first condition set being satisfied;
   wherein a condition in the first condition set is that the first timer is expired; wherein the first message is used for indicating at least one non-unicast identifier; wherein the first node is in a first radio resource control (RRC) state when transmitting the first message; wherein the first RRC state is an RRC connected state or an RRC inactive state; and
   the transceiver is further configured to receive a first signaling, a second signaling, a first signal and a second signal;
   wherein the first signaling is used to determine at least one of time-domain resources or frequency-domain resources occupied by the first signal, while the second signaling is used to determine at least one of time-domain resources or frequency-domain resources occupied by the second signal; wherein overlapping time-domain resources exist between the time-domain resources occupied by the first signal and the time-domain resources occupied by the second signal; wherein the first signaling comprises a first field used to indicate a first reference signal resource and the second signaling comprises a second field used to indicate a second reference signal resource different from the first reference signal resource; wherein a demodulation reference signal (DMRS) of a channel occupied by the first signal is Quasi Co-located (QCL) with a target reference signal resource and a DMRS of a channel occupied by the second signal is QCL with the target reference signal resource; wherein the target reference signal resource is one of the first reference signal resource or the second reference signal resource; and wherein a priority of the first signal and a priority of the second signal are used to determine the target reference signal resource from the first reference signal resource and the second reference signal resource, or, a Radio Network Temporary Identifier (RNTI) for scrambling a Cyclic Redundancy Check (CRC) carried by the first signaling and an RNTI for scrambling a CRC carried by the second signaling are used to determine the target reference signal resource from the first reference signal resource and the second reference signal resource.

2. The UE according to claim 1, wherein the transceiver is further configured to receive target data; wherein the maintaining the first timer comprises: as a response to receiving the target data, starting or restarting the first timer; wherein the target data comprises a Medium Access Control (MAC) Service Data Unit (SDU) from a Dedicated Traffic Channel (DTCH), or a Dedicated Control Channel (DCCH) or a Common Control Channel (CCCH).

3. The UE according to claim 1, wherein the transceiver is further configured to monitor a second message in a first time window; and determine whether to enter into an RRC idle state according to whether the second message is detected; wherein an expiration of the first timer is used to trigger a transmission of the first message; wherein a time of transmitting the first message is used to determine the first time window; and wherein the determining whether to enter into an RRC idle state according to whether the second message is detected comprises: not entering the RRC idle state when the second message is detected, or entering the RRC idle state when the second message is not detected.

4. The UE according to claim 1, wherein the transceiver is further configured to switch from a first Bandwidth Part (BWP) to a second BWP; wherein maintaining a first timer comprises: as a response to switching from the first BWP to the second BWP, starting or continuing the first timer.

5. The UE according to claim 4, wherein the transceiver is further configured to monitor a third message in a first time window; and determine whether to be camped on the second BWP according to whether the third message is detected; wherein an expiration of the first timer is used to trigger a transmission of the first message; wherein a time of transmitting the first message is used to determine the first time window; and wherein determining whether to be camped on the second BWP according to whether the third message is detected comprises: not being camped on the second BWP when the third message is detected, or being camped on the second BWP when the third message is detected.

6. The UE according to claim 1, wherein frequency-domain resources occupied by the first signal is a first subcarrier set, while frequency-domain resources occupied by the second signal is a second subcarrier set, wherein the first subcarrier set and the second subcarrier set belonging to a target Bandwidth Part (BWP), and wherein the first subcarrier set being orthogonal with the second subcarrier set in frequency domain.

7. The UE according to claim 1, wherein both frequency-domain resources occupied by the first signaling and frequency-domain resources occupied by the second signaling belong to a target control resource set associated with a first-type reference signal resource set and a second-type reference signal resource set; wherein the first field of the first signaling is used to indicate the first reference signal resource in the first-type reference signal resource set; and wherein the second field of the second signaling is used to indicate the second reference signal resource in the second-type reference signal resource set.

8. The UE according to claim 1, wherein frequency-domain resources occupied by the first signaling and frequency-domain resources occupied by the second signaling respectively belong to a first control resource set and a second control resource set, wherein overlapping frequency-domain resources exist between frequency-domain resources occupied by the first control resource set and frequency-domain resources occupied by the second control resource set; wherein a search space set associated with the first control resource set is associated with the first identifier, while a search space set associated with the second control resource set is not associated with the first identifier; and wherein a DMRS of a control signaling in the second control resource set and a DMRS of a control signaling in the first control resource set are Quasi Co-located (QCL).

9. A method for a user equipment (UE) in wireless communications, method comprising:
   maintaining a first timer;
   transmitting a first message, as a response to any condition in a first condition set being satisfied, wherein a condition in the first condition set is that the first timer is expired, wherein the first message is used for indicating at least one non-unicast identifier; wherein the first node is in a first radio resource control (RRC) state when transmitting the first message; wherein the first RRC state is an RRC connected state or an RRC inactive state; and
   receiving a first signaling, a second signaling, a first signal and a second signal;

wherein the first signaling is used to determine at least one of time-domain resources or frequency-domain resources occupied by the first signal, while the second signaling is used to determine at least one of time-domain resources or frequency-domain resources occupied by the second signal; wherein overlapping time-domain resources exist between the time-domain resources occupied by the first signal and the time-domain resources occupied by the second signal; wherein the first signaling comprises a first field used to indicate a first reference signal resource and the second signaling comprises a second field used to indicate a second reference signal resource different from the first reference signal resource; wherein a demodulation reference signal (DMRS) of a channel occupied by the first signal is Quasi Co-located (QCL) with a target reference signal resource and a DMRS of a channel occupied by the second signal is QCL with the target reference signal resource; wherein the target reference signal resource is one of the first reference signal resource or the second reference signal resource; and wherein a priority of the first signal and a priority of the second signal are used to determine the target reference signal resource from the first reference signal resource and the second reference signal resource, or, a Radio Network Temporary Identifier (RNTI) for scrambling a Cyclic Redundancy Check (CRC) carried by the first signaling and an RNTI for scrambling a CRC carried by the second signaling are used to determine the target reference signal resource from the first reference signal resource and the second reference signal resource.

10. The method according to claim 9, further comprising:
receiving target data; wherein maintaining the first timer comprises: as a response to receiving the target data, starting or restarting the first timer; wherein the target data comprises a Medium Access Control (MAC) Service Data Unit (SDU) from a Dedicated Traffic Channel (DTCH), or a Dedicated Control Channel (DCCH) or a Common Control Channel (CCCH).

11. The method according to claim 9, further comprising:
monitoring a second message in a first time window; and determining whether to enter into an RRC idle state according to whether the second message is detected; wherein an expiration of the first timer is used to trigger a transmission of the first message; wherein a time of transmitting the first message is used to determine the first time window; and wherein determining whether to enter into an RRC idle state according to whether the second message is detected comprises: not entering the RRC idle state when the second message is detected, or entering the RRC idle state when the second message is not detected.

12. The method according to claim 9, further comprises:
switching from a first Bandwidth Part (BWP) to a second BWP; wherein maintaining a first timer comprises: as a response to switching from the first BWP to the second BWP, starting or continuing the first timer.

13. The method according to claim 12, further comprising:
monitoring for a third message in a first time window; and determining whether to be camped on the second BWP according to whether the third message is detected; wherein an expiration of the first timer is used to trigger a transmission of the first message; wherein a time of transmitting the first message is used to determine the first time window; and wherein determining whether to be camped on the second BWP according to whether the third message is detected comprises: not being camped on the second BWP when the third message is detected, or being camped on the second BWP when the third message is detected.

14. The method according to claim 9, wherein frequency-domain resources occupied by the first signal is a first subcarrier set, while frequency-domain resources occupied by the second signal is a second subcarrier set, wherein the first subcarrier set and the second subcarrier set belonging to a target Bandwidth Part (BWP), and wherein the first subcarrier set being orthogonal with the second subcarrier set in frequency domain.

15. The method according to claim 9, wherein both frequency-domain resources occupied by the first signaling and frequency-domain resources occupied by the second signaling belong to a target control resource set associated with a first-type reference signal resource set and a second-type reference signal resource set; wherein the first field of the first signaling is used to indicate the first reference signal resource in the first-type reference signal resource set; and wherein the second field of the second signaling is used to indicate the second reference signal resource in the second-type reference signal resource set.

16. The method according to claim 9, wherein frequency-domain resources occupied by the first signaling and frequency-domain resources occupied by the second signaling respectively belong to a first control resource set and a second control resource set, wherein overlapping frequency-domain resources exist between frequency-domain resources occupied by the first control resource set and frequency-domain resources occupied by the second control resource set; wherein a search space set associated with the first control resource set is associated with the first identifier, while a search space set associated with the second control resource set is not associated with the first identifier; and wherein a DMRS of a control signaling in the second control resource set and a DMRS of a control signaling in the first control resource set are Quasi Co-located (QCL).

* * * * *